Figure 1:
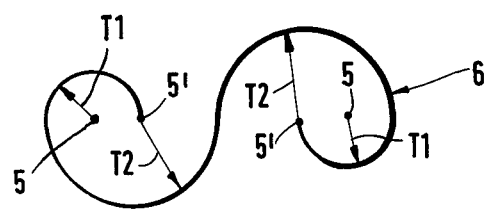

United States Patent [19]
Paul et al.

[11] 4,239,513
[45] Dec. 16, 1980

[54] SEPARATION OF PARTICLES FROM GASEOUS FLUID FLOWS

[76] Inventors: Egbert Paul, Beethoven-Str. 40, 7310 Plochingen; Karl Reither, Freiheitsstr. 45, 5210 Troisdorf-Spich, both of Fed. Rep. of Germany

[21] Appl. No.: 922,728

[22] Filed: Jul. 7, 1978

[30] Foreign Application Priority Data

Jul. 15, 1977 [DE] Fed. Rep. of Germany ....... 2731996

[51] Int. Cl.³ .......................... B03C 3/01; B03C 3/45; B03C 3/78; B01D 45/16
[52] U.S. Cl. ................................. 55/118; 55/122; 55/127; 55/130; 55/146; 55/156; 55/238; 55/440; 55/461
[58] Field of Search ....................... 55/237, 238, 257 R, 55/257 PV, 257 QV, 346, 347, 440–446, 449, 461, 462, 130, 118, 136–138, 154, 156, 122, 127, 146

[56] References Cited

U.S. PATENT DOCUMENTS

| 499,799 | 6/1893 | Parkinson | 55/444 X |
|---|---|---|---|
| 768,415 | 8/1904 | Wingrove | 55/444 |
| 2,191,187 | 2/1940 | Bingman | 55/238 |
| 3,077,714 | 2/1963 | McIlvaine | 55/238 |
| 3,236,031 | 2/1966 | Bennett et al. | 55/238 |
| 3,803,808 | 4/1974 | Shibuya et al. | 55/130 X |
| 3,980,455 | 9/1976 | Masuda | 55/154 X |
| 3,994,704 | 11/1976 | Shibuya et al. | 55/130 |

FOREIGN PATENT DOCUMENTS

| 1122498 | 1/1962 | Fed. Rep. of Germany | 55/443 |
|---|---|---|---|
| 2680 | of 1890 | United Kingdom | 55/440 |

*Primary Examiner*—Kathleen J. Prunner
*Attorney, Agent, or Firm*—Browdy and Neimark

[57] ABSTRACT

In gas washer and similar separator devices which utilize stationary wall means to deflect a gas flow and to subject the same to centrifugal force for continuously separating out foreign particulate matter which is collected on or adjacent the stationary wall means, the invention provides spirally curved laminae constituting the stationary wall means and co-operating to define passage means, at least a part of which has a cross-section which first narrows and then widens in the direction of fluid flow and which is also curved spirally first in one and then in the opposite direction. Nozzle means may be arranged to feed moisture into the fluid flow to assist wet separation, and by electrically insulating conductive laminae from one another, the invention may also be used as an electrostatic precipitator.

3 Claims, 4 Drawing Figures

SEPARATION OF PARTICLES FROM GASEOUS FLUID FLOWS

DESCRIPTION

This invention concerns separator devices for the continuous separation of relatively heavy suspended particles such as drops of moisture and/or dust from a gaseous fluid flow.

The invention is particularly directed to such separator devices in which deflection means deflect the fluid flow along stationary walls and heavy particles, which are separated by centrifugal force, are collected externally of the deflection means.

In known dust collectors, a distinction is made, inter alia, between gravity separators, wet-operating separators and electrostatic precipitators. The invention seeks to provide a separator device wherein the characteristics of some or all of the prior art dust collectors are utilized.

The present invention accordingly provides a separator device, particularly for a gas washer, for the continuous separation of suspended heavy particles such as drops of moisture and/or dust from a gaseous fluid flow, which separator has means for deflecting the flow of fluid along stationary walls and for collecting the heavy particles, separated by the effect of centrifugal force, on the outside of the deflecting means, characterised in that deflection is effected by at least one passage having at least a part wherein the cross-section narrows and subsequently widens in the flow direction and which is curved spirally first in one direction and then in the opposite direction of deflection.

Construction, manufacture and a standardization can be simplified by constructing rectangular deflection passages in the form of laminae inserted one into the other. For the purpose of wet dust collection, spray nozzles for feeding moisture or a gas-washing medium can be arranged upstream of the laminae. Alternatively, the laminae can be alternately electrically insulated from one another, so that a potential difference can be applied to them. Thus, the separator can be combined with the function of an electrostatic precipitator.

Figure 2:
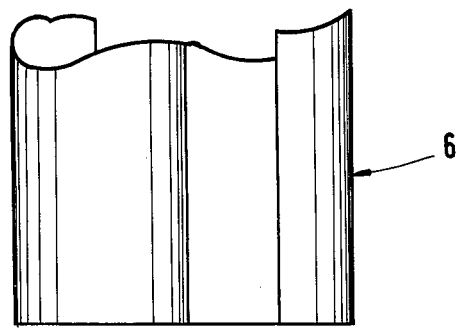
Figure 3:
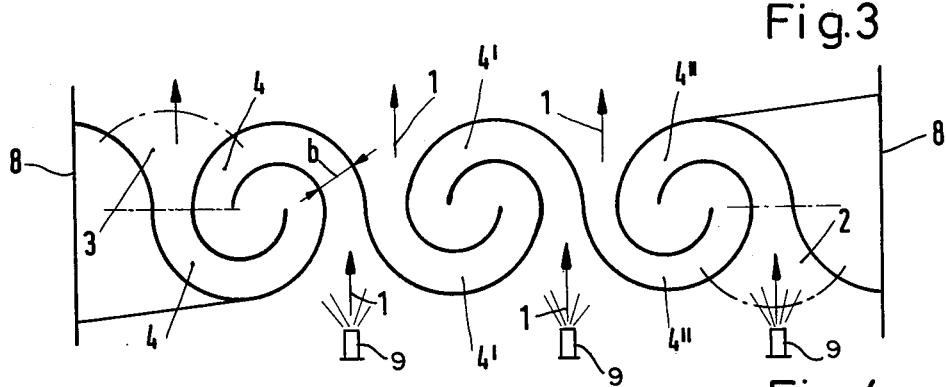
Figure 4:
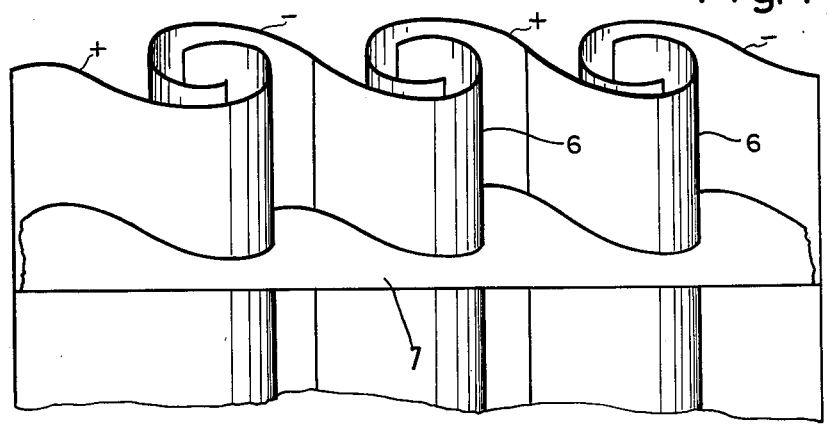

The invention will be described further, by way of example, with reference to the accompanying drawings, in which:

FIGS. 1 and 2 are a front elevation and a side elevation, respectively, of an individual lamina such as can be used for constructing a separator embodying the invention; and FIGS. 3 and 4 are respectively a front elevation and a side elevation of a separator using a plurality of laminae as shown in FIGS. 1 and 2.

Each individual lamina 6, illustrated in FIGS. 1 and 2, for constructing a separator in accordance with the invention, is of substantially S-shaped and spirally curved configuration. A first semi-cylindrical shell having a radius of curvature $T_1$ and a center of curvature 5 is followed by a second semi-cylindrical shell having a radius of curvature $T_2$ which is approximately twice the radius of curvature $T_1$ and a center of curvature 5'. A semi-cylindrical shell of the same size, but curved in the opposite direction, is contiguous to the second semi-cylindrical shell and is in turn followed by a small semi-cylindrical shell having the radius of curvature $T_1$. The laminae may be made from sheet metal or plastics material or a sheet metal coated with plastics material.

In order to construct a separator device, a plurality of laminae 6 are inserted axially one into the other and are held in position relative to one another by, for example, transversely extending, electrically insulating laminae 7 acting as spacers. The laminae extending parallel and adjacent to one another are accommodated between side boundary walls 8 of the separator device. The laminae together form curved labyrinth passages 4,4',4", the entry end of which constitutes an acceleration path 2 for the fluid flow 1 and the exit end of which constitutes a diffuser 3. These gas deflection passages have a rectangular cross-section and their widths b measured parallel to the radii of curvature are substantially smaller than the passage dimensions measured at right angles thereto in a vertical plane. In the flow conditions illustrated, the deflection passage is first of all curved through 360° in a counterclockwise direction with a discretely decreased radius of curvature and is then also curved through 360° in the opposite direction of curvature with a similarly increased radius of curvature. It will be appreciated that the extent of deflection can be increased by providing the ends of the laminae with even longer spirals.

Spray nozzles 9 for feeding separating fluid for wet-separation may be arranged in the region of the gas flow passages. By the term "in the region" as used in the present specification and claims with respect to the relationship of the nozzles 9 to the gas flow passages 4, it is meant that the nozzles 9 may be either in the passages 4 or upstream thereof. In another embodiment, the laminae may be made from electrically conductive material and may be alternately electrically insulated from one another, so that differential voltages, as shown by the "+" and "−" symbols in FIG. 4, may be applied thereto. Thus, the function of an electrostatic precipitator is obtained and can be used for the purpose of separation.

The mode of operation of the arrangement will now be explained briefly

The gas containing heavy particles to be separated flows into the passages 4,4',4" in the direction of the arrows 1 and is accelerated in the acceleration paths 2 upon entering the deflection passages. The fluid flow is then deflected with a high rate of flow and increasing curvature, whereby centrifugal force centrifuges the heavy particles against the outer wall where they are deposited. The separated particles descend along the wall and can be discharged from the deflection passages in suitable discharge channels (not shown). Reversal of flow in the center of the passages not only forms a secondary vortex assisting the separation of dust, but also pulls away a film of fluid which enhances wet collection of dust and which, as a result of centrifugal forces and the secondary vortex and after being intimately intermixed with the exhaust air to be cleaned, is pressed against the other wall of the passage where it leaves the flow passage system in the form of a liquid film. Since it is possible to arrange the individual elements exactly parallel to one another, this enables the individual elements to be electrically switched to act alternately as cathode and anode, whereby the system can also be operated as an electrostatic precipitator. A diffuser 3 is provided at the outlet of the deflection passages and retards and stabilizes the fluid flow 1.

Owing to its simple construction and the use of simple individual elements, the illustrated arrangement is capable of relatively simple and inexpensive manufacture. Furthermore, it forms a combination of multi-cyclones, venturi washers and, if required, electrostatic precipitators. It will be appreciated that the described arrangement may be used simply as an individual element having a simple double spiral or it may be used in an assembly of a plurality of elements.

We claim:

1. A separator device for the continuous separation of foreign particulate matter including drops of moisture and dust from a gaseous fluid flow, comprising:

stationary wall means for deflecting said fluid flow and subjecting the same to centrifugal force to separate said particulate matter and collect said particulate matter on or adjacent said stationary wall means, said stationary wall means comprising a plurality of substantially S-shaped and spirally curved laminae which are inserted axially one into another to define a plurality of passages located adjacent and parallel to one another to permit simultaneous fluid flow therethrough, the width of each said passage being substantially smaller than the length thereof, and each of said passages having a part at which the cross-section narrows and another subsequent part at which the cross-section widens in the direction of fluid flow and wherein each of said passages is curved spirally first through 360° in one direction of deflection with increasing curvature and then through 360° in the opposite direction with decreasing curvature, wherein each of said spirally curved laminae comprises first, second, third and fourth semi-cylindrical portions, wherein said first portion is connected contiguously to said second portion curving in the same direction as said first portion, said second portion having a radius approximately twice that of said first portion, said second portion is connected contiguously to said third portion, said third portion having the same radius as said second portion but curving in the opposite direction, and said third portion is connected contiguously to said fourth portion, said fourth portion curving in the same direction as said third portion and having a radius approximately half that of said third portion; and spacer means for holding said laminae in defined positions relative to one another.

2. A separator device according to claim 1, said laminae being made from electrically conductive material and each held electrically insulated from adjacent laminae for the application of electric potentials of opposite polarity thereto.

3. A separator device as set forth in claim 1, further comprising moisture feed nozzles arranged in the region of said passages for feeding moisture into said fluid flow.

* * * * *